United States Patent
Schubert

(10) Patent No.: US 6,777,646 B2
(45) Date of Patent: Aug. 17, 2004

(54) LASER MACHINING HEAD FOR MACHINING A WORKPIECE BY MEANS OF A LASER BEAM

(75) Inventor: Peter Schubert, Gaggenau (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 0 days.

(21) Appl. No.: 10/200,188

(22) Filed: Jul. 23, 2002

(65) Prior Publication Data

US 2003/0019855 A1 Jan. 30, 2003

(30) Foreign Application Priority Data

Jul. 27, 2001 (DE) .......................................... 101 36 686

(51) Int. Cl.[7] .......................... B23K 26/06; H01S 3/121
(52) U.S. Cl. .................................... 219/121.75; 372/14
(58) Field of Search ........................ 219/121.67, 121.6, 219/121; 372/14

(56) References Cited

U.S. PATENT DOCUMENTS 6,124,565 A * 9/2000 Morishita et al. ...... 219/121.67

6,204,473 B1 * 3/2001 Legge .................... 219/121.67

FOREIGN PATENT DOCUMENTS

| DE | 43 17 384 A1 | 3/1994 |
| DE | 196 22 413 C2 | 7/1998 |

* cited by examiner

Primary Examiner—Don Wong
Assistant Examiner—Hung T Vy
(74) Attorney, Agent, or Firm—Birch, Stewart, Kolasch & Birch, LLP

(57) ABSTRACT

A laser machining head for machining a workpiece by a laser beam. The head has a head housing through which the laser beam passes along a central axis. A carrier member for a lens optics system for focusing the laser beam is mounted on the head housing and is displaceable relative to the latter in the direction of the central axis. A first setting device includes a cable connected to the carrier member and a cable drum connected to the head housing for winding up the cable in order to move the carrier member towards the head housing. A second setting device causes the carrier member to be displaced in the direction away from the head housing, with the second setting device being separate from the first setting device.

8 Claims, 3 Drawing Sheets

LASER MACHINING HEAD FOR MACHINING A WORKPIECE BY MEANS OF A LASER BEAM

BACKGROUND OF THE INVENTION

1. Field of the Invention

The invention relates generally to a laser machining head for machining a workpiece by means of a laser beam so that welding tasks, cutting tasks, etc can be carried out on the workpiece, and more particularly, to a laser machining head whose position in relation to a workpiece may be controlled easily.

2. Discussion of Background Art

It is already generally known to measure the distance between a workpiece and a laser machining head during the machining of the workpiece by a capacitance method, that is to say using a sensor electrode electrically connected to the laser machining head, which supplies a sensor signal corresponding to the distance whose magnitude depends on the capacitance between the sensor electrode and the workpiece. The sensor electrode may be the electrically conducting tip of a nozzle from which the laser beam emerges.

By monitoring the sensor signal it is possible to position the laser machining head relative to the workpiece in order that the workpiece can be machined in a suitable manner. Positioning is done in this case by means of a control device which receives the measured distance as an actual value and controls the position of the sensor electrode or of the laser machining head as a function of a comparison of the actual value with a specified desired value.

In this distance adjustment, however, it is not necessary to constantly to displace the entire laser machining head. On the contrary, it suffices to change only the position of a section of the laser machining head facing towards the workpiece, this section carrying a lens optics system which serves to focus the laser beam. Due to the positional adjustment of this section the position of the focus of the laser beam relative to the workpiece can then be kept constant, which is necessary for the faultless machining of the workpiece.

DE 196 22 413 C2 already discloses a laser machining head for machining a workpiece by means of a laser beam. This known laser machining head contains a head housing through which the laser beam passes along a central axis; a carrier member for a lens optics system for focusing the laser beam mounted on the head housing and displaceable relative to the latter in the direction of the central axis; a first setting device to which a cable connected to the carrier member and a cable drum connected to the head housing for winding up the cable belong in order to move the carrier member towards the head housing; and a second setting device by means of which the carrier member is displaceable in the direction away from the head housing.

In the known laser machining head the carrier member is composed of a kind of cage with end rings located opposite one another between which a cable is stretched which is wound around a cable drum. Thus, depending on the direction of rotation of the cable drum the carrier member can be moved in one direction or another. Since the cable drum comes to lie between the end rings of the carrier member, the latter has a relatively great overall length which results in a relatively long and hence heavy laser machining head, since on account of its size the carrier member is also relatively heavy.

SUMMARY OF THE INVENTION

The underlying aim of the invention is to refine a laser machining head of the type described above in such a way that it has a small overall length and a lower weight.

A laser machining head according to the invention distinguishes itself in that the second setting device is separate from the first setting device. That is, it is arranged or constructed spatially separated from the latter. The overall length of the carrier member can, therefore, be considerably reduced compared to the overall length of the known carrier member, which results in a shorter laser machining head in the longitudinal direction of the beam and in a considerable reduction in its weight. Thus, a laser machining head of this type can be employed more universally and handled more easily.

According to a development of the invention, the second setting device is constructed as a compression spring which is arranged between the head housing and the carrier member in such a way that it is supported at one end on the head housing and at the other end on the carrier member and seeks to move the carrier member away from the head housing. The displacement of the carrier member relative to the head housing along the central axis can then ensue when, on the one hand, the cable is wound up against the force of the compression spring in order to pull the carrier member towards the head housing or when, on the other hand, the brake of the cable drum is released so that under the action of the compression spring the cable is wound off the cable drum, as a result of which the carrier member is moved away from the head housing. Its final position is fixed, in that the rotation of the cable drum is monitored and stopped at a time corresponding to the final position of the carrier member. The cable drum would then have moved through a corresponding angular path which is determined with the aid of a rotary or angle decoder coupled to the shaft of the cable drum. On winding up the cable onto the cable drum against the force of the compression spring, a corresponding procedure can be used to determine the final position of the carrier member. Here also the cable drum is then stopped again after a predetermined angular path detected by the angle decoder has been covered. In other words, a change in the distance between the laser machining head and the workpiece could be converted here into angular paths in order to control the rotation of the cable drum.

According to another development of the invention the second setting device is a hydraulic device for the hydraulic displacement of the carrier member. In this case, between the head housing and the carrier member a hydraulic cylinder, for instance, may be used through whose piston the carrier member is displaceable. If the chamber of the hydraulic cylinder is filled with hydraulic liquid while the cable drum is simultaneously released the carrier member moves away from the head housing, while in the reverse direction of motion with the winding of the cable onto the cable drum, the hydraulic liquid can flow out of the hydraulic cylinder. The displacement position of the carrier member relative to the head housing can once again be determined in both cases through the angular path covered by the cable drum.

According to another and highly advantageous development of the invention the head housing and the carrier member act as a setting device and can form a hermetically sealed inner chamber to which an excess pressure can be applied for the pneumatic displacement of the carrier member. A relatively high excess pressure in the inner chamber when the brake of the cable drum is released then results in the displacement of the carrier member away from the head housing, wherein here also the rotary position of the cable drum may again be monitored, using the aforesaid angle decoder for instance, to determine the final position of the carrier member. If, on the other hand, the carrier member is to be moved towards the head housing the cable drum is again set in operation in order to wind up the cable. In doing so, any further excess pressure building up in the inner chamber can be released through a blow-off valve so that the drive of the cable drum in this case does not have to work against an excessively high counteracting force. In the specified example a relatively high excess pressure would constantly prevail in the inner chamber.

In order to prevent this, a suitable excess pressure in the inner chamber for displacing the carrier member can be provided but only for the time needed to displace the carrier member along a predetermined path. On reaching the displacement position of the carrier member the excess pressure can then be reduced immediately to a relatively low value so that no constituents from the outside can penetrate into the inner chamber and thereby damage devices by soiling them. The drive of the cable drum can operate without difficulty against this relatively low excess pressure when the carrier member is to be moved again towards the head housing.

Preferably according to a development of the invention the cable, the cable drum and a drive provided for them are arranged in the inner chamber so that they are better protected against environmental effects.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
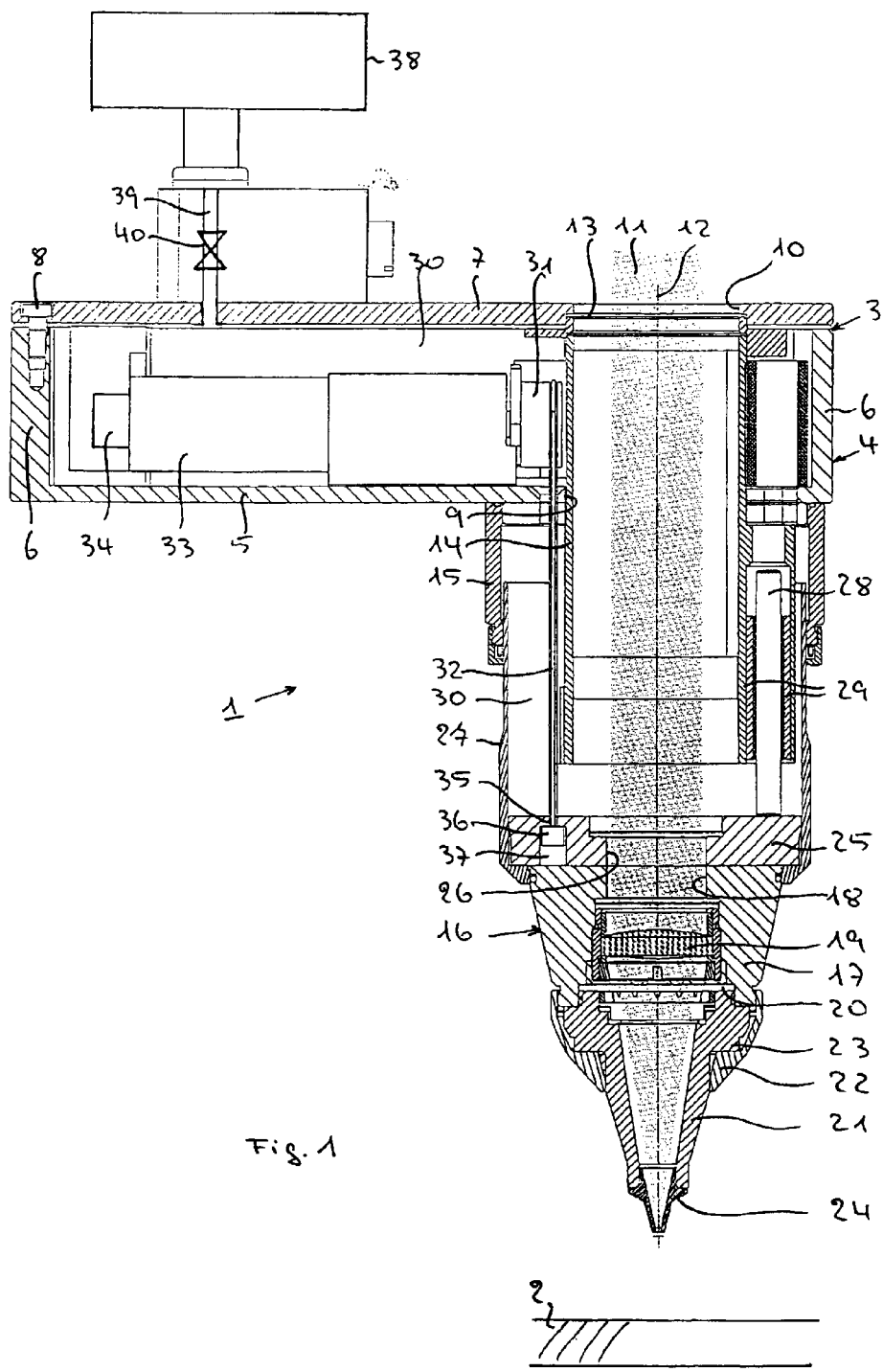
FIG. 1 shows a laser machining head having a pneumatically operated second setting device.

Referring now to the drawings, wherein like reference numerals designate identical or corresponding parts through the several views and more particularly to FIG. 1 which shows a first embodiment of the present invention. A laser machining head generally bears the reference symbol 1 and is positionable relative to a workpiece 2. The laser machining head 1 has a head housing 3 composed of a box-shaped basic housing part 4 having a bottom wall 5 and side walls 6 and of a cover 7. The cover 7 can be secured with the aid of screws 8 to the end faces of the side walls 6.

The bottom wall 5 and the cover 7 possess circular openings 9, 10 aligned with one another which allow a laser beam 11 to pass through the head housing 3. In doing so the laser beam 11 travels along a central axis 12 which is perpendicular to the plate-like walls 5, 7. The opening 10 in the cover 7 is hermetically sealed by means of a plate 13 transparent to laser radiation. From the side of the bottom wall 5 a hollow cylindrical tube 14 is inserted through the opening 9 into the head housing 3 and fastened thereto. In doing so, the cylinder axis of the hollow cylindrical tube 14 and the central axis 12 coincide. The laser beam 11 travels coaxially through this hollow cylindrical tube 14. A cylindrical collar 15 arranged coaxially with respect to the opening 9 and fastened to the outside of the bottom wall 5 is located concentrically outside the hollow cylindrical tube 14 and at a distance therefrom. This cylindrical collar 15 may also be regarded as a part of the head housing 3. At the same time the open end face of the hollow cylindrical tube 14 projects beyond the open end face of the cylindrical collar 15.

A carrier member 16 is arranged at a distance opposite the open end face of the hollow cylindrical tube 14. This carrier member 16 has a base member 17 with a central passageway 18 for the laser beam 11. The central passageway 18 is located coaxially with respect to the central axis 12. Inside the central pathway 18 there is a focusing or lens optics system 19 consisting, for example, of a plurality of lenses for focusing the laser beam 11. At the exit side of the beam the lens optics system 19 is covered by a transparent plate 20 which may, for example, be a glass plate.

At the exit side of the beam a nozzle 21 is fastened to the base member 17 and this is done with the aid of a union nut 22 which is screwed onto an outer thread of the base member 17 and via a shoulder 23 draws the nozzle against the end face of the base member 17. Located at the tip of the nozzle 21 is a nozzle electrode 24 made of electrically conducting material which is fastened there in suitable fashion. This nozzle electrode 24 serves for measuring by capacitance the distance from the workpiece 2, and hence, for determining the distance of the lens optics system 19 from the workpiece 2. The nozzle electrode 24 is provided with a test lead which is not shown and can be electrically insulated with respect to the nozzle 21. The measurement of the distance itself will not be described in detail here. The principle of this measurement is generally known.

At the beam admission end there is fastened to the base member 17 a carrier plate 25 which projects radially outwardly over the base member 17. The carrier plate 25 also has a central passage opening 26 for the laser beam 11 to pass through. A cylindrical sleeve 27 receives the carrier plate 25 and extends behind the lower surface of the plate at the beam exit end. This cylindrical sleeve 27 extends towards the head housing 3 and projects at this end to fit more or less into the cylindrical collar 15. In doing so the cylindrical sleeve 27 becomes located coaxially at a distance with respect to the hollow cylindrical tube 14.

At the beam admission end the carrier plate 25 is fixedly connected by three cylindrical guide pins 28 of which only one is shown in FIG. 1 because of the sectional illustration. These cylindrical guide pins 28 run parallel to the central axis 12 and are spaced at equal angles in the peripheral direction of the carrier plate 25. Each of the guide pins 28 is received by a cylindrical guide 29 which is fastened to the outer perimeter of the hollow cylindrical tube 14. Thus, due to the guide pins 28 being received in the cylindrical guides 29, the carrier member 16 and therewith the nozzle 21 and the nozzle electrode 24 may be displaced in one or the other direction along the central axis 12 relative to the head housing 3.

It may be pointed out that the head housing 3 and the carrier member 16 form an inner chamber 30 which due to the use of suitable seals is gastight.

Serving first of all for the displacement of the carrier member 16 relative to the head housing 3 along the central axis 12 is a first setting device, composed of a cable drum 31, a cable 32 wound thereon, a motor 33 for driving the cable drum 31 which is seated on the shaft of the motor 33 and an angle transmitter 34 which is likewise seated on the shaft of the motor 33. With the aid of the first setting device the carrier member 16 can be displaced towards the head housing 3. For this purpose, the cable 32 passes through an opening 35 in the carrier plate 25 and is firmly connected at its free end to a stop which lies in a rear blind-end bore opening 37 in the carrier plate 25 and engages behind the edge of the opening 35. Thus, if the cable 32 is wound onto the cable drum 31 the carrier member 16 is pulled towards the head housing 3.

At the same time it may be noted that the cable 32 preferably runs parallel to the central axis 12 and that the shaft of the motor 33 and the axis of rotation of the cable drum 31 are tangential to the central axis 12. The motor 33 with the cable drum 31 and angle transmitter 34 are fastened to the inside of the bottom wall 5.

In order that the carrier member 16 can be moved in the opposite direction along the central axis 12, that is in a direction away from the head housing 3, an excess pressure can be built up in the gastight inner chamber 30 formed by the head housing 3 and the carrier member 16. This excess pressure in the inner chamber 30 is of such a magnitude that when acting on the surface of the carrier plate 25 at the beam admission end, it can displace the carrier member 16, provided that the brake in the cable drum 31 is released and the cable 32 can unwind from the cable drum 31. In doing so the excess pressure is provided by a pressure supply device 38 which may be constructed for instance as a fan having a high displacement volume. The pressure supply device 38 is in pressure contact via a pressure line 39 with the inner chamber 30, the pressure line 39 passes in a sealed manner through a corresponding opening in the cover 7. In the pressure line 39 or at any other suitable point in the wall of the inner chamber 30 a blow-off valve 40 is arranged in order that the internal pressure in the inner chamber 30 cannot rise above a maximum value. If, under permanent high pressure in the inner chamber 30, the carrier member 16 is moved towards the head housing 3, the volume of the inner chamber 30 diminishes and the pressure would rise so that with increasing displacement of the carrier member 16 the motor 33 would have to work against a steadily rising pressure. In order to prevent this, the blow-off valve 40 is provided which contributes to the motor 33 not being placed under excessively high load.

As already stated at the outset, instead of a constantly high pressure in the inner chamber 30 a relatively small pressure could also be maintained in the inner chamber 30 in order to prevent particles coming into the inner chamber 30 from the outside. In this manner soiling of the inner chamber and the components contained therein is prevented. If the carrier member 16 is then shifted away from the head housing 3, an appropriately high excess pressure is produced only during the actual displacement operation and on reaching the desired final position of the carrier member 16 is automatically released again by a pressure reduction valve being opened. When the carrier member 16 is then moved in the opposite direction the motor 33 would need to work only against the relatively low internal pressure in the inner chamber 30.

Figure 2:
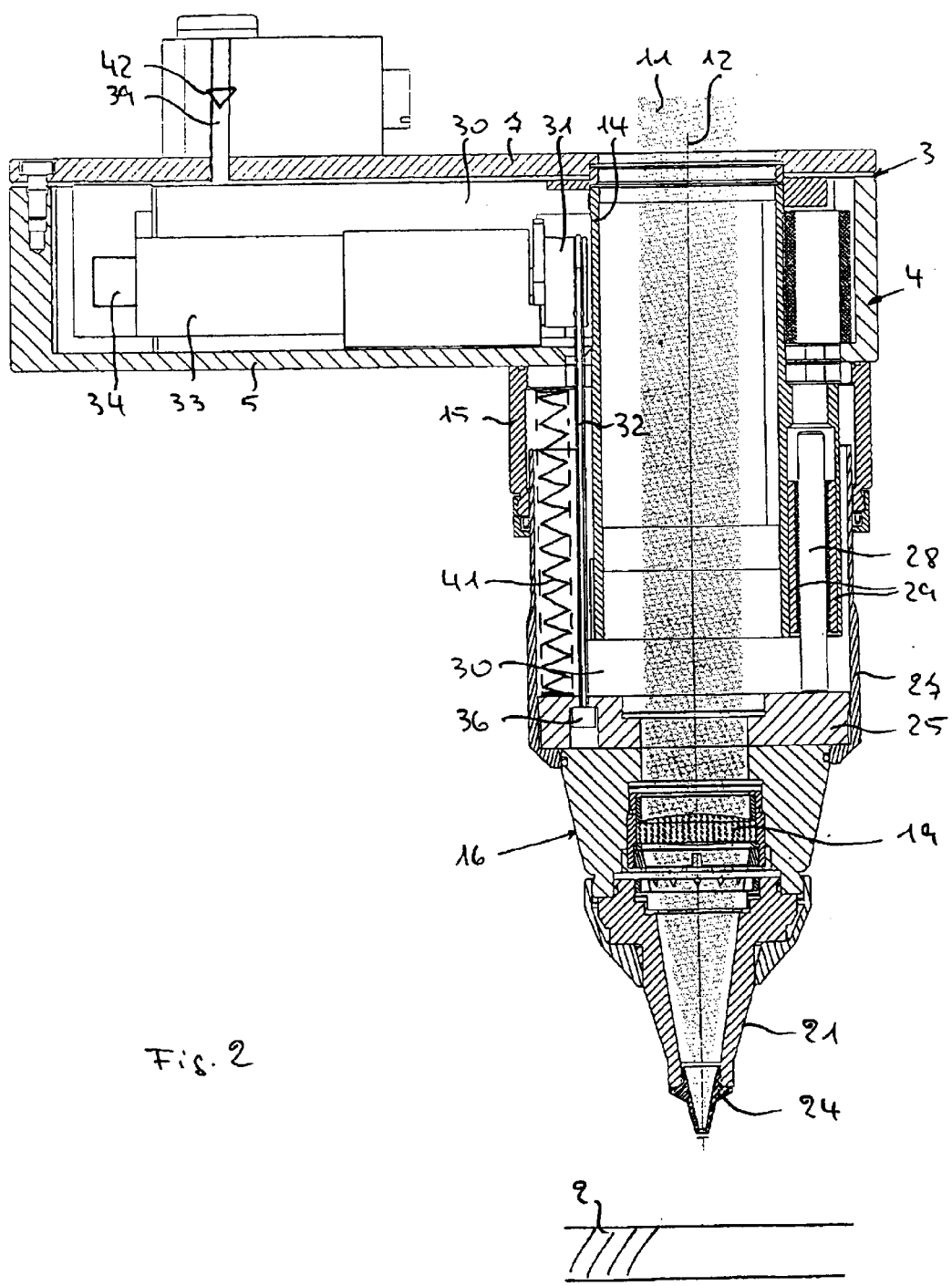
FIG. 2 shows a laser machining head having a second setting device formed by a compression spring.

FIG. 2 shows another embodiment of the present invention. Elements identical to those in FIG. 1 are provided with the same reference symbols and are not described again.

At variance with the embodiment in FIG. 1, the second setting device here consists of a compression spring 41 which is supported at one end against the beam admission side of the carrier plate 25 and at the other end in the region of the bottom wall 5 against the head housing 3. The compression spring 41 is constantly striving to push the carrier member 16 away from the head housing 3. If the brake in the cable drum 31 is released, the compression spring 41 succeeds in this endeavour. The cable 32 is then unwound from the cable drum 31 until the cable drum 31 is again stopped or braked on reaching the final position of the carrier member 16. This can be done under control of the data from the angle transmitter 34. If, on the other hand, the carrier member 16 is to be moved towards the head housing 3, the motor 33 is driven in the opposite direction of rotation as a result of which the cable 32 is rewound onto the cable drum 31 against the force of the compression spring. Here also the cable drum 31 is stopped again on reaching the corresponding final position of the carrier member 16 based on data from the angle transmitter 34.

By means of a pressure reduction valve 42 in the pressure line 39, the inner chamber 30 is kept under low excess pressure in order to prevent particles penetrating from the outside into the interior of the head housing 3.

Figure 3:
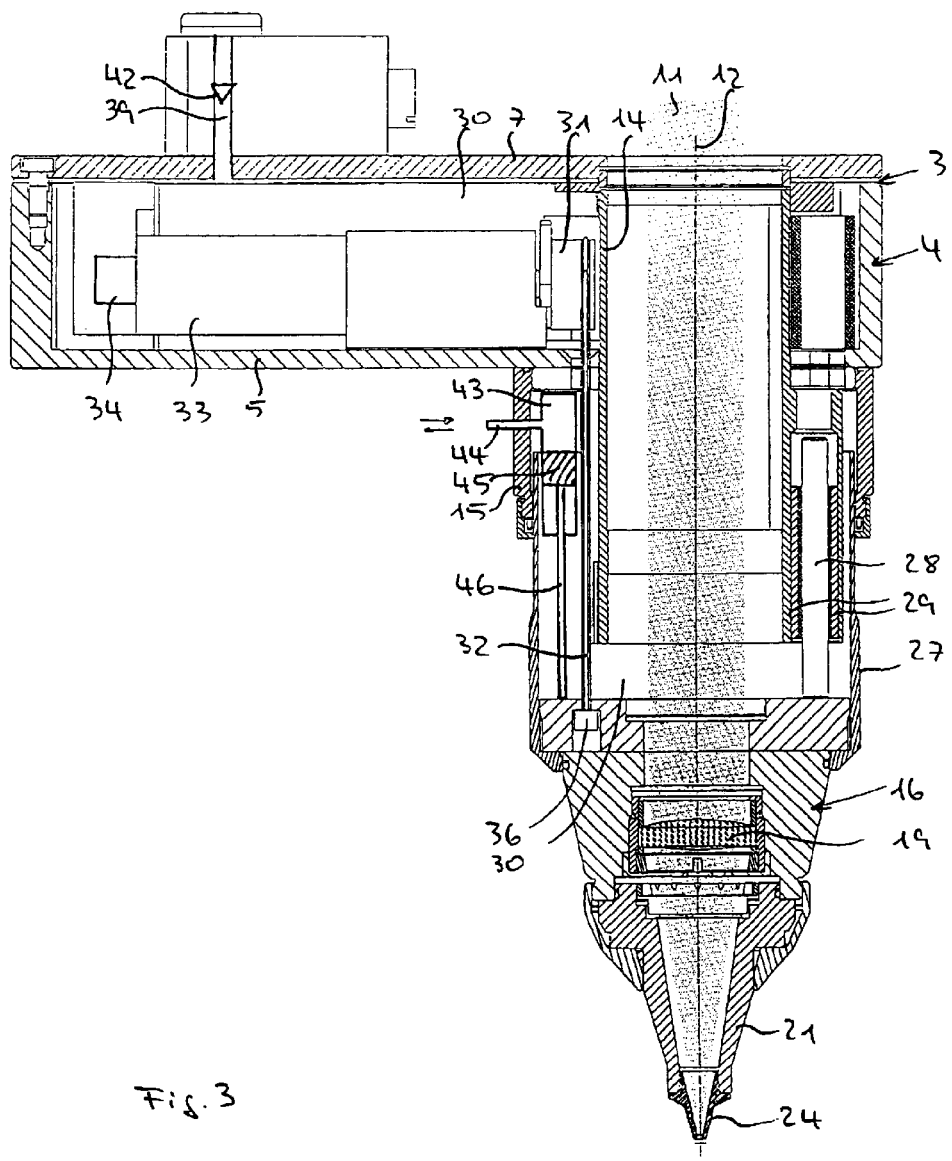
FIG. 3 shows a laser machining head having a hydraulically operated second setting device.

FIG. 3 shows a third embodiment of the invention. Elements identical to those in FIG. 1 are once again provided with the same reference symbols and are not described again.

In contrast with FIG. 1, in the space here between the hollow cylindrical tube 14 and the wall region formed by the cylindrical collar 15 and the cylindrical sleeve 27, there is a hydraulic cylinder 43 which is connected to a feed/discharge line 44 for hydraulic liquid, wherein the feed/discharge line 44 projects through the wall of the cylindrical collar 15. The hydraulic cylinder 43 is fixedly fitted on the side of the bottom wall 5 of the head housing 3 in such a way that a piston 45 received therein has its piston rod 46 projecting out of the hydraulic cylinder 43 pointing in the direction of the carrier plate 25 and can displace the plate via the piston rod 46. Thus, the free end of the piston rod 46 is in pressure contact with the surface on the beam admission side of the carrier plate 25.

If the carrier member 16 is to be shifted away from the head housing 3 in the direction of the central axis 12 the brake in the cable drum 31 is released and hydraulic liquid, oil for instance, is injected under pressure into the hydraulic cylinder 43 via the feed/discharge line 44. The piston 45 thus travels out of the hydraulic cylinder 43 parallel to the central axis 12 and pushes against the surface on the beam admission side of the carrier plate 25. In doing so, the carrier member 16 is pushed away, while at the same time the cable 32 is unwound from the cable drum 31. If, on the other hand, the carrier member 16 is to be displaced again towards the head housing 3, the cable 32 is wound onto the cable drum 31 through the corresponding direction of rotation of the motor 33 and it has to be ensured, by appropriate control of a discharge valve for instance, that the hydraulic liquid can now flow out of the hydraulic cylinder 43 through the feed/discharge line as the piston 45 is displaced again towards the head housing 3. It then pushes the hydraulic liquid out of the hydraulic cylinder 43.

Numerous additional modifications and variations of the present invention are possible in light of the above teachings. It is therefore to be understood that within the scope of the appended claims, the invention may be practiced otherwise than as specifically described herein.

What is claimed is:

1. A laser machining head for machining a workpiece by means of a laser beam, comprising:

a head housing through which the laser beam passes along a central axis;

a carrier member for a lens optics system for focusing the laser beam, said carrier member being mounted on the head housing and displaceable relative to the latter in the direction of the central axis;

a first setting device including a cable connected to the carrier member and a cable drum connected to the head housing, the cable extending from the carrier member to the cable drum only to be wound up thereon, in order to move the carrier member towards the head housing; and a second setting device for displacing the carrier member in the direction away from the head housing, said second setting device being separate from the first setting device.

2. The laser machining head according to claim 1, wherein the second setting device is a compression spring arranged between the head housing and the carrier member.

3. The laser machining head according to claim 1, wherein the second setting device is a hydraulic device for the hydraulic displacement of the carrier member.

4. The laser machining head according to claim 1, wherein the head housing and the carrier member form a hermetically sealed inner chamber to which an excess pressure for the pneumatic displacement of the carrier member can be applied.

5. The laser machining head according to claim 4, wherein the excess pressure is suitable for displacing the carrier member and is constantly available in the inner chamber.

6. The laser machining head according to claim 5, wherein the second setting device has a blow-off valve so that in the event of a displacement of the carrier member by the first setting device a further rise in pressure in the inner chamber is prevented.

7. The laser machining head according to claim 4, wherein the excess pressure in the inner chamber is suitable for displacing the carrier member and is available only for a period of time which is needed for displacing the carrier member along a predetermined path.

8. The laser machining head according to claim 4, wherein the cable, the cable drum and a drive provided for them are arranged in the inner chamber.

* * * * *